United States Patent
Jung et al.

(10) Patent No.: US 9,940,831 B2
(45) Date of Patent: Apr. 10, 2018

(54) POINTING DEVICE AND CONTROLLING METHOD THEREOF

(71) Applicant: Samsung Electronics Co., Ltd., Suwon-si, Gyeonggi-do (KR)

(72) Inventors: Min-kyu Jung, Seoul (KR); Sung-bin Kuk, Suwon-si (KR); Hark-joon Kim, Ansan-si (KR); Mi-ra Park, Seoul (KR); Sang-il Lee, Seongnam-si (KR); Seong-hoon Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/853,336

(22) Filed: Sep. 14, 2015

(65) Prior Publication Data

US 2016/0078754 A1  Mar. 17, 2016

(30) Foreign Application Priority Data

Sep. 15, 2014 (KR) .................. 10-2014-0121992

(51) Int. Cl.
*G08C 23/04* (2006.01)
*H04B 10/40* (2013.01)

(52) U.S. Cl.
CPC ............. *G08C 23/04* (2013.01); *H04B 10/40* (2013.01)

(58) Field of Classification Search
CPC ................................ G08C 23/04; H04B 10/40
USPC ........................................ 398/107; 340/3.71
See application file for complete search history.

(56) References Cited

U.S. PATENT DOCUMENTS

| | | | |
|---|---|---|---|
| 2002/0133310 A1 | 9/2002 | Tamura | |
| 2004/0140882 A1* | 7/2004 | Burleson | G08C 17/02 340/3.71 |
| 2009/0052899 A1* | 2/2009 | Mok | G08C 17/02 398/106 |
| 2010/0309056 A1* | 12/2010 | Rofougaran | H01Q 1/2283 342/417 |
| 2011/0279366 A1* | 11/2011 | Lohbihler | G01S 5/0247 345/157 |
| 2012/0135692 A1 | 5/2012 | Feri et al. | |
| 2012/0138874 A1* | 6/2012 | Yuan | C09K 11/02 252/582 |
| 2012/0307336 A1* | 12/2012 | Yap | G02B 5/128 359/241 |
| 2014/0207517 A1* | 7/2014 | Oshima | H04N 5/2356 705/7.29 |

FOREIGN PATENT DOCUMENTS

| | | |
|---|---|---|
| JP | 2003-284168 A | 10/2003 |
| KR | 10-2002-0073234 A | 9/2002 |
| KR | 10-2009-0016316 A | 2/2009 |
| KR | 10-0946673 B1 | 3/2010 |

(Continued)

*Primary Examiner* — David Payne
*Assistant Examiner* — Omar S Ismail
(74) *Attorney, Agent, or Firm* — Jefferson IP Law, LLP

(57) ABSTRACT

A pointing device and a controlling method thereof are provided. The controlling method of the pointing device includes transmitting an identification signal to an external device that is targeted by the pointing device according to a user input, receiving a reflected signal that is generated by reflecting the identification signal from a reflective surface attached to a surface of the external device, and analyzing the reflected signal and identifying the external device.

16 Claims, 14 Drawing Sheets

(56) References Cited

FOREIGN PATENT DOCUMENTS

| KR | 10-2010-0056193 A | 5/2010 |
| KR | 10-1233783 B1 | 2/2013 |
| KR | 10-2013-0079813 A | 7/2013 |

* cited by examiner

POINTING DEVICE AND CONTROLLING METHOD THEREOF

CROSS-REFERENCE TO RELATED APPLICATION(S)

This application claims the benefit under 35 U.S.C. § 119(a) of a Korean patent application filed on Sep. 15, 2014 in the Korean Intellectual Property Office and assigned Serial number 10-2014-0121992, the entire disclosure of which is hereby incorporated by reference.

TECHNICAL FIELD

The present disclosure relates to a pointing device and a controlling method thereof. More particularly, the present disclosure relates to a pointing device configured to distinguish an external device indicated by a user and a controlling method thereof.

BACKGROUND

A remote control may be included with an electronic device to help the user to operate or use the device. The remote control is configured to provide input of the specific functions that are performed by that one electronic device.

Users would prefer a single remote control rather than multiple remote controls.

The most widely used device to provide a common input for multiple electronic devices is an integrated remote control. Such an integrated remote control integrates all the functions or data of the different electronic devices into that one device. For one example, the integrated remote control may include power buttons for the external devices, with the buttons of the integrated remote control being mapped to the functions of the external devices. When a user distinguishes and operates certain buttons, the mapped function signals of the external devices are transmitted. Thus, only the external device intended to be operated by a user operates while the other devices do not respond.

Because such an integrated remote control integrates all the functions to distinguish and operate into one device, a user may experience inconveniences. Further, while the number of the electronic devices to be operated increases, a number of the buttons also increases, and further increases user inconvenience.

Another related method is to install a signal transmitting module to devices to distinguish electronic devices, and transmit a signal to one device. This method may have an advantage in that the external devices installed with the specific signal transmitting modules can be easily distinguished. However, the method may have a disadvantage in that the specific signal transmitting module has to be attached to the external devices to be distinguished. Thus, there is a drawback that it is necessary to additionally install the existent devices with specific hardware and signal transmitting modules.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a pointing device which can distinguish a plurality of external devices only with a single pointing device and a reflective surface attached onto a surface of an external device and a controlling method thereof.

In accordance with an aspect of the present disclosure, a method for controlling a pointing device is provided. The method includes transmitting an identification signal to an external device that is targeted by the pointing device according to a user input, receiving a reflected signal that is generated by reflecting the identification signal from a reflective surface attached to a surface of the external device, and analyzing the reflected signal and identifying the external device The identification signal may be a multi-wavelength infrared signal, and the reflected signal is generated as only a preset wavelength is reflected among the multi-wavelength infrared signal.

The reflective surface is coated with a pigment that reflects the preset wavelength.

The identification signal may be a multi-frequency signal, and the reflected signal is generated as an amplitude of a preset frequency is amplified or offset among the multi-frequency signal.

The reflective surface comprises a frequency selective surface (FSS) that amplifies or offsets the preset frequency.

The method may additionally include generating an operating signal corresponding to the identified external device and transmitting the operating signal.

The method may additionally include determining whether the identified external device is registered. When the identified external device is registered, the generating of the operating signal comprises generating the operating signal based on an operating signal database.

The method may additionally include determining whether the identified external device is registered, and outputting information regarding the identified external device when the identified external device is registered.

The method may additionally include connecting with the identified external device for communication according to a user command, receiving information related to content output by the identified external device, and outputting the related information.

In accordance with another aspect of the present disclosure, a pointing device is provided. The pointing device includes a user interface configured to receive a user input, a transmitter configured to transmit an identification signal to an external device targeted by the pointing device, a receiver configured to receive a reflected signal that is generated by reflecting the identification signal from a reflective surface attached to a surface of the external device, and a controller configured to control the transmitter to transmit the identification signal to the external device according to a user input, and analyze the reflected signal and identify the external device.

The identification signal may be a multi-wavelength infrared signal, and the reflected signal is generated as only a preset wavelength is reflected among the multi-wavelength infrared signal.

The reflective surface is coated with a pigment that reflects the preset wavelength.

The identification signal may be a multi-frequency signal, and the reflected signal is generated as an amplitude of a preset frequency is amplified or offset among the multi frequency signal.

The reflective surface may include a frequency selective surface (FSS) that amplifies or offsets the preset frequency.

The controller may generate an operating signal corresponding to the identified external device and control the transmitter to transmit the operating signal.

The controller may determine whether the identified external device is registered, and when the distinguished external device is registered, the operating signal is generated based on an operating signal database.

The pointing device may additionally include a display. The controller may determine whether the identified external device is registered, and when the identified external device is registered, control the display to output information regarding the identified external device.

The pointing device may additionally include a display, and a communicator configured to communicate with the identified external device. The controller may connect with the identified external device for communication according to a user command, control the communicator to receive information related to content output from the identified external device, and control the display to output the related information.

According to the various embodiments described above, a plurality of external devices can be distinguished with one signal pointing device, and specific external device can be selected and operated with the pointing device, or information related with a specific external device can be displayed on the pointing device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "first", "second", etc. may be used to describe diverse components, but the components are not limited by the terms. The terms are only used to distinguish one component from the others.

In the present application, the terms "include" and "consist of" designate the presence of features, numbers, operations, components, elements, or a combination thereof that are written in the specification, but do not exclude the presence or possibility of addition of one or more other features, numbers, operations, components, elements, or a combination thereof.

In the following description of the present disclosure, a "module" or a "unit" performs at least one function or operation, and may be implemented with hardware, software, or a combination of hardware and software. In addition, a plurality of "modules" or a plurality of "units" may be integrated into at least one module except for a "module" or a "unit" which has to be implemented with specific hardware, and may be implemented with at least one processor (not shown).

Figure 1:
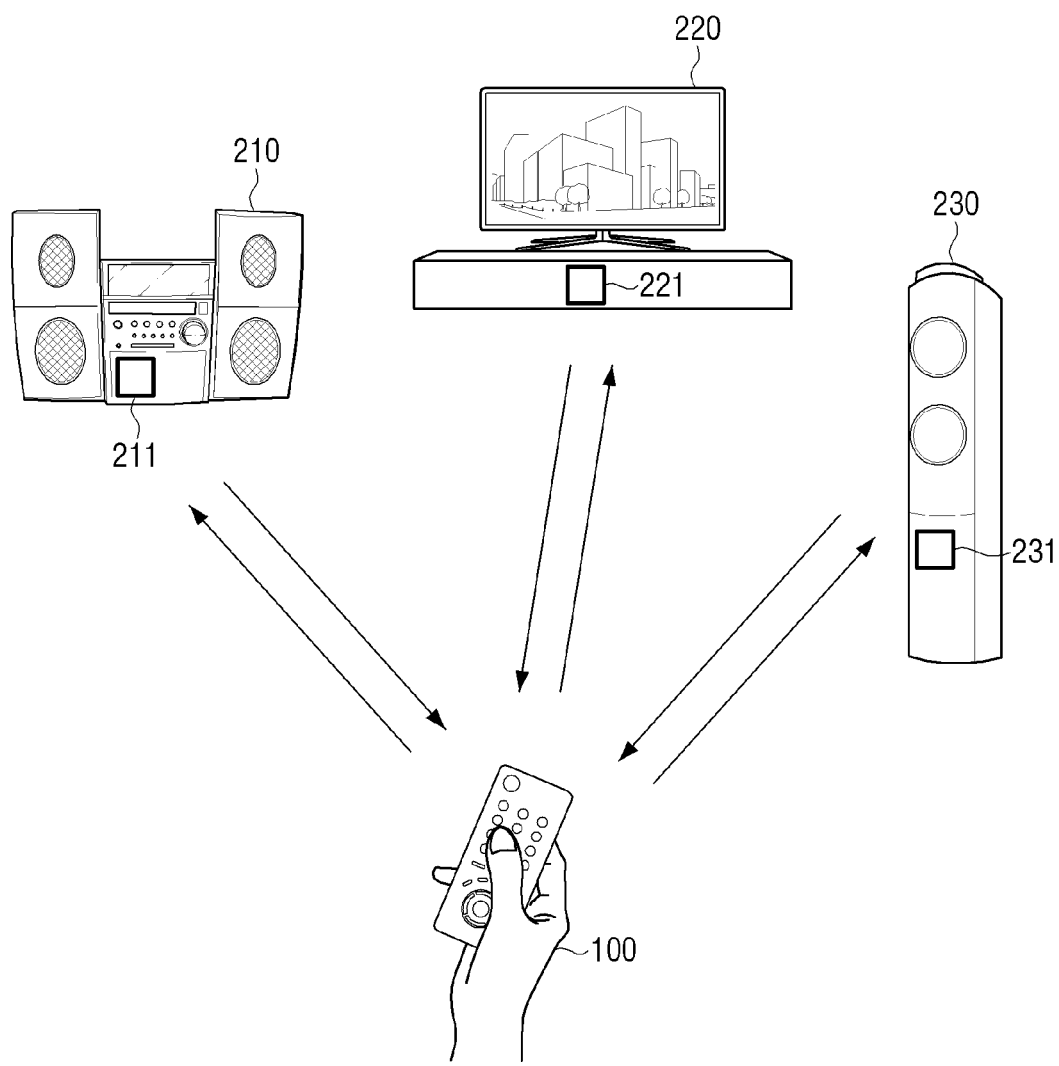
FIG. 1 is a system diagram of a pointing device and external devices according to an embodiment of the present disclosure.

FIG. 1 is a system diagram of a pointing device and external devices according to an embodiment of the present disclosure.

Referring to FIG. 1, a pointing device 100 is configured to transmit and receive a signal from the various external devices 210, 220, and 230. The pointing device 100 may transmit an identification signal and distinguish between any of the external devices. For example, the external device 200 may be an audio source 210, a television (TV) 220, and an air conditioner 230, as illustrated in FIG. 1. However, the external device may not be limited herein. The external device may be any electronic device that can be controlled or operated with a remote control.

Referring to FIG. 1, the outer surfaces of the external devices 210, 220, 230 may include reflective surfaces 211, 221, 231, respectively. According to an embodiment, even when there is no specific hardware sensors installed on the external devices 210, 220, 230, the pointing device 100 may transmit an identification signal and distinguish the external devices 210, 220, 230 by using the signal that is reflected and returned from the reflective surfaces 211, 221, 231. The reflective surfaces 211, 221, and 231, which may be coated on a surface of the device, may alter a property of the original signal when that signal is reflected.

The pointing device 100 may transmit an identification signal to the external devices 210, 220, 230, and receive a reflected signal from the reflective surface 201 of the external device 200. The pointing device 100 may analyze the reflected signal, which has a different property based on the reflective surface, and identify one of the external devices 210, 220, and 230 to operate. Thereafter, the pointing device 100 may transmit an operating signal for the identified external device, display information related with the identified external device 200, or display information related with the content that is output from the identified external device. The pointing device 100 may be implemented to be a remote control or any other suitable implementation. For example, the pointing device 100 may be implemented to be a mobile device such as a smartphone.

A user may respectively operate a plurality of the external devices 200 using a single pointing device 100 as described above.

Figure 2:
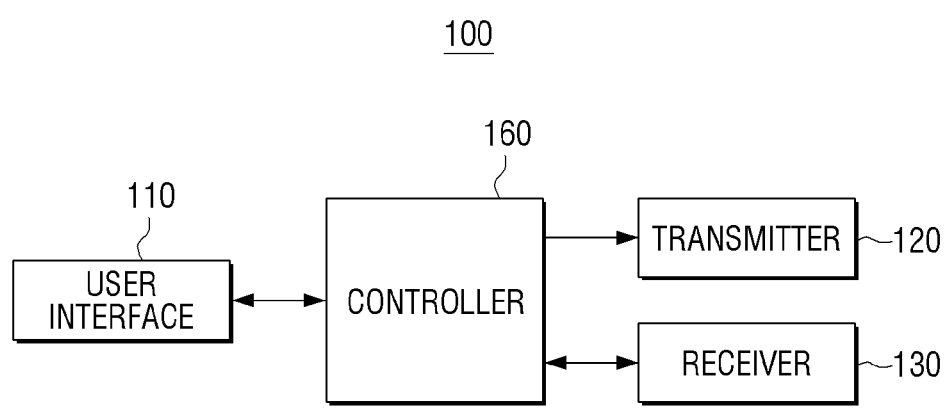
FIG. 2 is a block diagram of a pointing device according to an embodiment of the present disclosure.

FIG. 2 is a block diagram of a pointing device according to an embodiment of the present disclosure.

Referring to FIG. 2, the pointing device 100 may include a user interface 110, a transmitter 120, a receiver 130 and a controller 160. The pointing device 100 may be implemented to be a remote control, although embodiments are not limited thereto. Accordingly, the pointing device 100 may be a smartphone, a tablet personal computer (PC), or a smart remote control, but is not limited thereto.

The user interface 110 may allow the pointing device 100 to exchange commands or the like with the user. For example, the user interface 110 may be a touch screen, a key pad or a button. The user interface 110 may receive a user input such as an identification signal, an operating signal, or a command to connect communication with an external device.

The transmitter 120 may be configured to transmit, for example, an identification signal the external device. The transmitter 120 may have different implementations depending on the type of signal that is used as the identification signal. For example, the transmitter 120 may be implemented to transmit a multi-wavelength infrared signal.

The receiver 130 may be configured to receive a reflected signal that is reflected from the reflective surface of the external device. The receiver 130 may receive the reflected signal. Alternatively, the receiver 130 may also analyze the properties of the reflected signals such as a wavelength, frequency, or intensity, etc.

The controller 160 may control the overall operation of the pointing device 100. Specifically, the controller 160 may control the transmitter 120 to transmit an identification signal to the external device according to a user input that is input from the user interface 110, and identify the external device by analyzing the reflected signal that is received by the receiver 130.

Specifically, the controller 160 may control the transmitter 120 to transmit an identification signal, which may be a multi-wavelength infrared signal. The reflective surface attached on the external device may be formed such that, in response to receiving the multi-wavelength infrared signal, only a preset wavelength from the transmitted multi-wavelength infrared signal is reflected. Accordingly, the preset wavelength may have a greater intensity as compared to the other wavelengths from the transmitted multi-wavelength infrared signal. For example, the reflective surface 201 may be coated with a pigment which reflects only the preset wavelength from the multi-wavelength infrared signal.

Further, the controller 160 may control the transmitter 120 to transmit an identification signal which may be a multi-frequency signal. The reflective surface 201 on the external device may receive the multi-frequency signal and reflect a reflected signal that has an amplitude of a preset frequency from the transmitted multi frequency signal that is amplified or offset. Accordingly, the reflected signal may have the preset frequency with an amplified amplitude. For example, the reflective surface may include a frequency selective surface (FSS) that amplifies or offsets an amplitude of a preset frequency.

Further, the controller 160 may generate an operating signal corresponding to the identified external device and control the transmitter 120 to transmit the operating signal to the identified external device. For example, different operating signal codes may be set for each external device so that their corresponding operating signals do not influence the other external devices. For example, when the operating signal corresponding to a TV is transmitted, if an air conditioner receives such an operating signal, the air conditioner may not perform any function.

Further, the controller 160 may determine whether the identified external device is registered. When the identified external device 200 is registered, the controller 160 may generate a corresponding operating signal by using an operating signal database, and control the transmitter 120 to transmit the operating signal to the external device. The "registered device" as used herein may refer to the external device with the reflective properties or a corresponding device that was previously stored by the pointing device. A user may register a new external device on the pointing device 100 through automatic updating or manual inputting.

According to the pointing device 100 described above, a user may target an external device to operate from a plurality of the external devices, and exclusively operate that specific external device with one pointing device 100.

Figure 3:
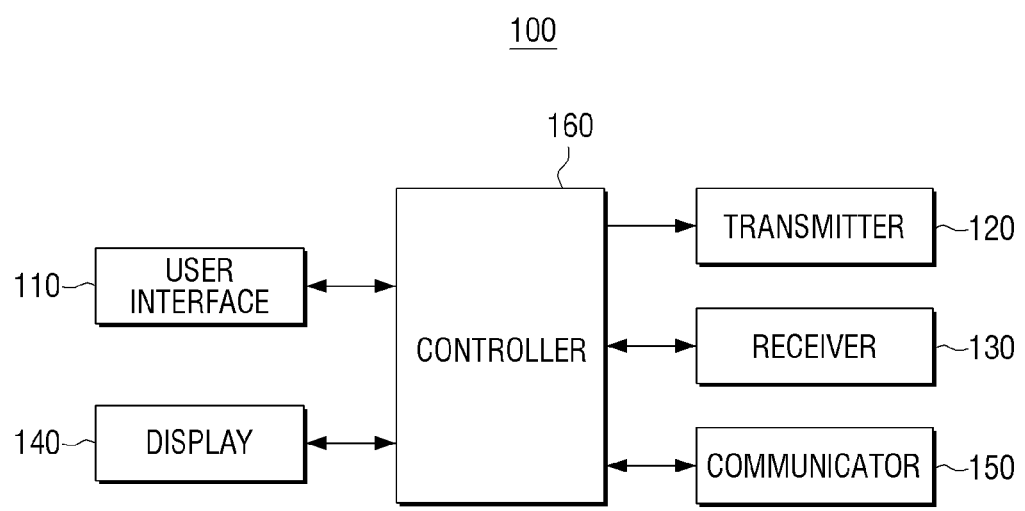
FIG. 3 is a block diagram of a pointing device according to an embodiment of the present disclosure.

FIG. 3 is a block diagram of a pointing device according to an embodiment of the present disclosure.

Referring to FIG. 3, the pointing device 100 includes a user interface 110, a transmitter 120, a receiver 130, a display 140, a communicator 150, and a controller 160.

The user interface 110 may receive a user input. For example, the user interface 110 may be a button or key pad on the pointing device 100. However, various embodiments are not limited to the examples provided above. Accordingly, a user input may be received via a touch input on a user interface (UI) that is displayed on a screen of a mobile device such as a smartphone. When the user input is received via the UI, the UI may be modified and displayed based on the identified external device.

The transmitter 120 may be configured to transmit an identification signal or an operating signal to the external device. The transmitter 120 may transmit various forms of signals such as multi-wavelength infrared rays or multi-frequency waves. For example, the transmitter 120 may transmit a directional identification signal within 10° left and right/up and down from a signal transmission direction.

The receiver 130 may be configured to receive a reflected signal (i.e., the identification signal) based on the identification signal with the properties altered by the reflective surface on the external device. The receiver 130 may be configured as an optical sensor such as a photo interrupter, or a photo detector. Further, the receiver 130 may be a sensor configured to receive electromagnetic signals. The receiver 130 may convert the reflected signal into a digital signal and deliver the digital signal to the controller 160. The digital signal may include information such as intensity per wavelength or amplitude per frequency.

The display 140 may be configured to output information of an external device, which receives the identification signal, to a user. According to an embodiment, when the external device identified by the controller 160 is registered, the display 140 may output information of the external device. According to another embodiment, the display 140 may output information regarding the content which is output from the external device.

The display 140 may also perform the function of the user interface 110 by displaying a UI on the screen. For example, when the pointing device 100 is implemented as a smartphone, the display of the smartphone may output a UI for receiving a user input to control the external device. Further, in response to the user input to request information related with the content that is being output from the external device, the display of the smartphone may convert the screen and output the relevant information instead of the UI.

The communicator 150 may perform the transmission and reception with the external device and a network such as the Internet. Specifically, the communicator 150 may be configured as a wireless communication module, and may perform the wireless communication with the external device. The communicator 150 may connect the communication with the external device according to a user command, and receive information related with the content, which is being output from the external device 200, from the external device 200. For example, the wireless communication method used by the communicator 150 may be one of infrared (IR) communication, Zigbee® communication, Bluetooth® communication and Wi-Fi communication. When the communicator 150 uses the IR communication method, the communicator 150 may also cause the transmitter 120 to transmit the multi-wavelength infrared signal.

The controller 160 may control the user interface 110, the transmitter 120, the receiver 130, the display 140, and the communicator 150. Moreover, the controller 160 may control a storage source in the pointing device 100, which is not illustrated herein. The controller 160 may include a module to control the pointing device 100, and may include a read only memory (ROM) and a random access memory (RAM) to store data.

According to an embodiment, the pointing device 100 may target (i.e., point at) the external device for identification and operation by using an infrared signal.

Figure 4A:
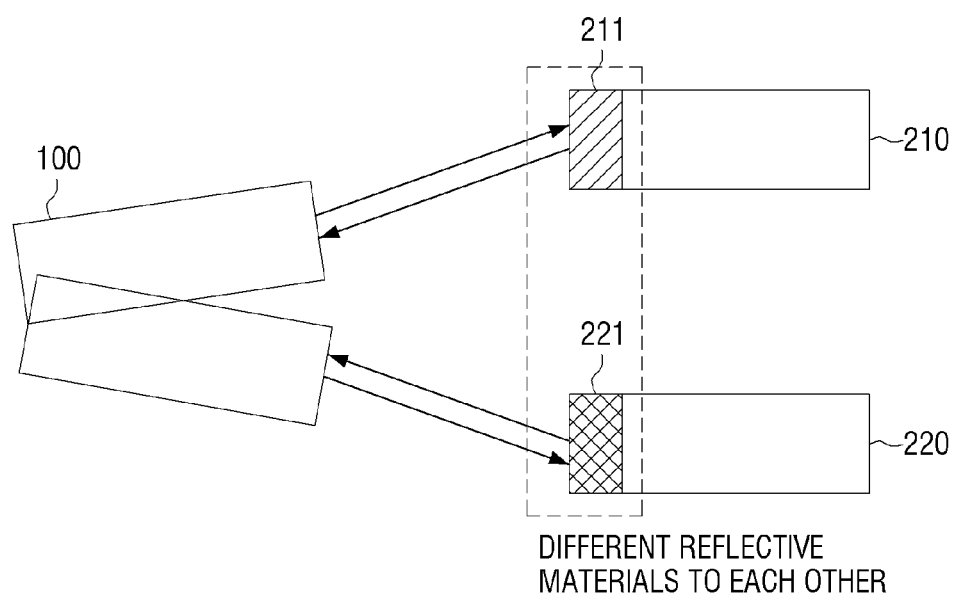
FIGS. 4A and 4B are diagrams illustrating a multi-wavelength infrared signal according to an embodiment of the present disclosure.
Figure 4B:
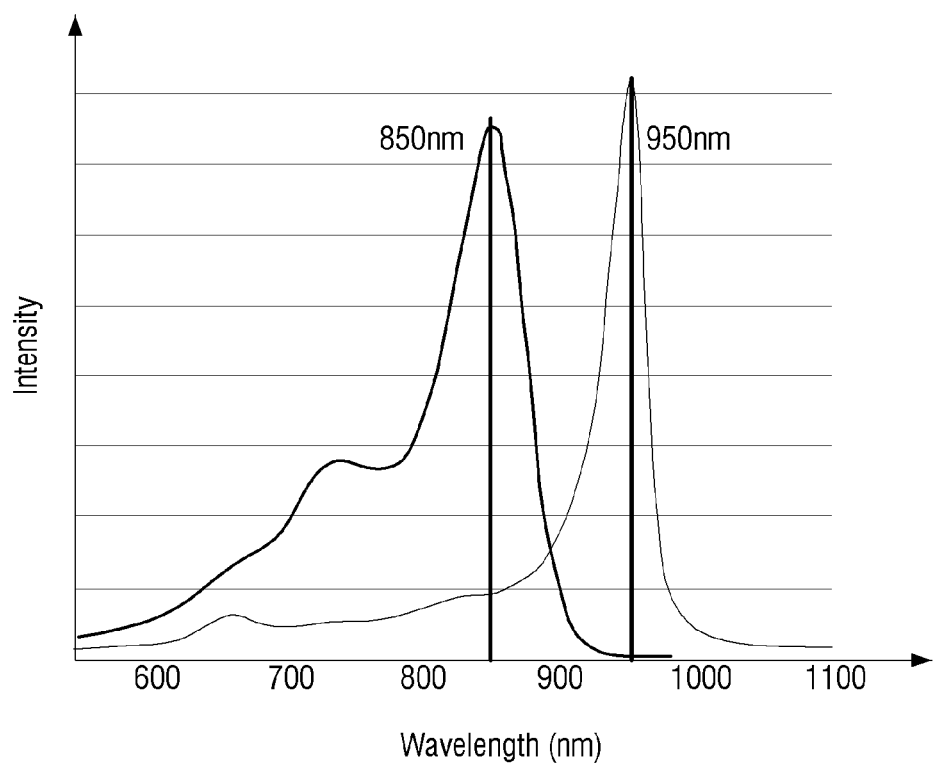

FIGS. 4A and 4B are diagrams illustrating a multi-wavelength infrared signal according to an embodiment of the present disclosure.

Referring to FIG. 4A, the controller 160 of the pointing device 100 may control the transmitter 120 to transmit the identification signal to the different external devices 210 and 220. The reflective surface 211 of the external device 210 and the reflective surface 221 of the external device 220 may reflect the identification signal. Herein, because the reflective surfaces 211 and 221 may be coated with different reflective materials, the pointing device 100 receives different reflected signals from the two external devices 210 and 220. For example, the reflective materials coated on the reflective surfaces 211 and 221 may be infrared reflecting pigments.

Referring to FIG. 4B, the intensity of the reflected signal is illustrated when a first pigment having an 850 nm bandwidth and a second pigment having a 950 nm bandwidth is applied to external devices 210 and 220, respectively. As illustrated in FIG. 4B, the first pigment has a peak value at the 850 nm wavelength, and a value substantially closes to zero at the 950 nm wavelength. On the contrary, the second pigment has value that is much smaller at the 850 nm wavelength while having a peak value at the 950 nm wavelength. Thus, by coating different surfaces with the reflecting pigments having different wavelength bandwidths, the controller 160 may analyze the intensity per wavelength regarding the received reflected signal and determine which external device 200 transmits the reflected signal.

For example, it is assumed that the reflective surface 211 of the first external device 210 is coated with the first pigment (i.e., 850 nm) and the reflective surface 221 of the second external device 220 is coated with the second pigment (i.e., 950 nm). The identification signal transmitted by the pointing device 100 may be the infrared signals formed of 850 nm and 950 nm wavelengths which belong to a normal remote control frequency bandwidth (38~43 KHz). When the intensity of the reflected signal is determined to be highest at 850 nm bandwidth as a result of analyzing the reflected signal received at the pointing device 100, the pointing device 100 may be oriented towards the first external device 210. On the contrary, when the intensity of the reflected signal is highest at 950 nm bandwidth, the pointing device 100 may be oriented towards the second external device 220.

For another example, the external device 200 may be identified by coating an infrared reflecting pigment on the reflective surface of the external device. Further, the external device may be identified by coating two types of the infrared reflecting pigments or not coating any infrared reflecting pigment. The controller 160 may digitalize the reflected signal so that it is '1' when a received value is equal to or higher than a preset intensity value and '0' when a received value is less than a preset intensity value. When one type of the infrared reflecting pigment is coated on the reflective surface of the external device, the controller 160 may obtain digital signal '01' or '10'. When two types are both coated, the controller 160 may obtain digital signal '11'. When none of the infrared reflecting pigment is coated, a digital signal '00' may be converted. Through the above combination, many types of the external device 200 can be identified with a relatively smaller number of the infrared reflecting pigments.

According to an embodiment, the pointing device 100 may identify the external device by using electromagnetic wave. Regarding the method using the electromagnetic wave, the reflective surface of the external device may include an FSS. If the reflective surfaces includes the FSS, the reflective surface may amplify or offset the amplitude of a preset frequency. Further, because the FSS can perform a frequency filter function, the pointing device 100 may identify the external device 200 by using the transmission/reflection properties of a specific frequency of the FSS.

FIGS. 5A, 5B, 5C, and 5D are diagrams of multi-frequency signals according to an embodiment of the present disclosure.

Figure 5A:
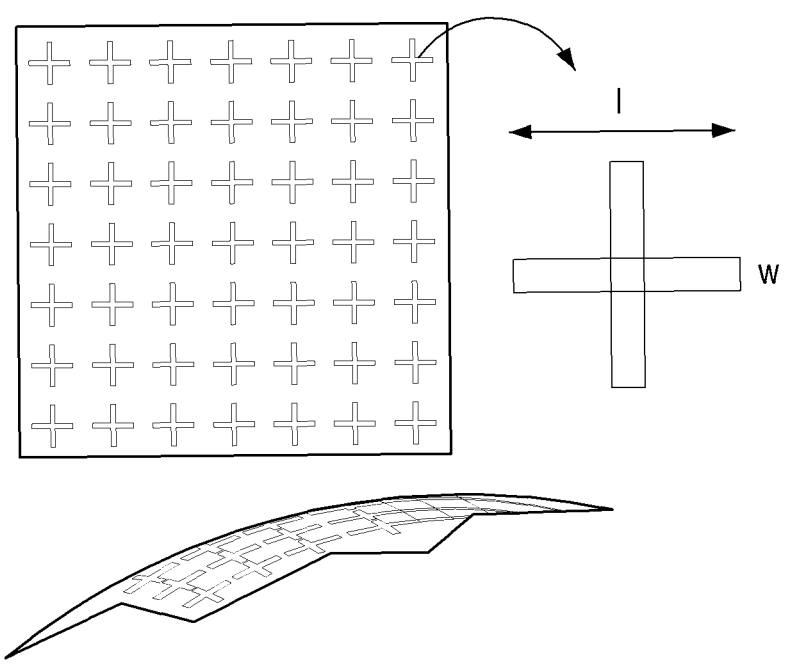
FIGS. 5A, 5B, 5C, and 5D are diagrams of multi-frequency signals according to an embodiment of the present disclosure.

Referring to FIG. 5A, the FSS includes a periodic structure of specific lattice. In particular, the FSS includes a curved shape having 7×7 cross elements. The FSS may be configured as a curved shape as well as a flat shape, which will be further described below. The cross element of FIG.

5A may be loop type FSS element, which may filter the narrowest frequency band. When different FSS element is used, the width of the frequency band may be expanded. Thus, a user may configure the FSS differently according to purpose.

Figure 5B:
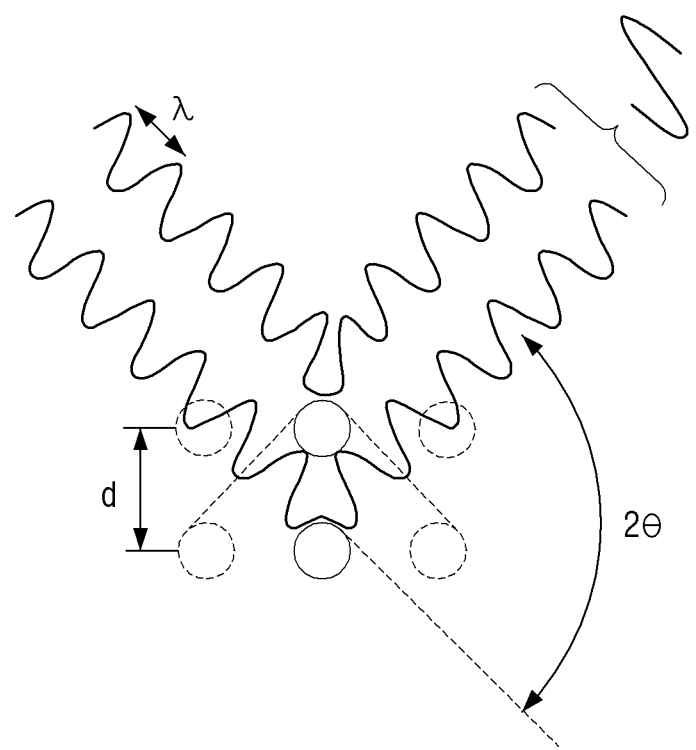
Figure 5C:
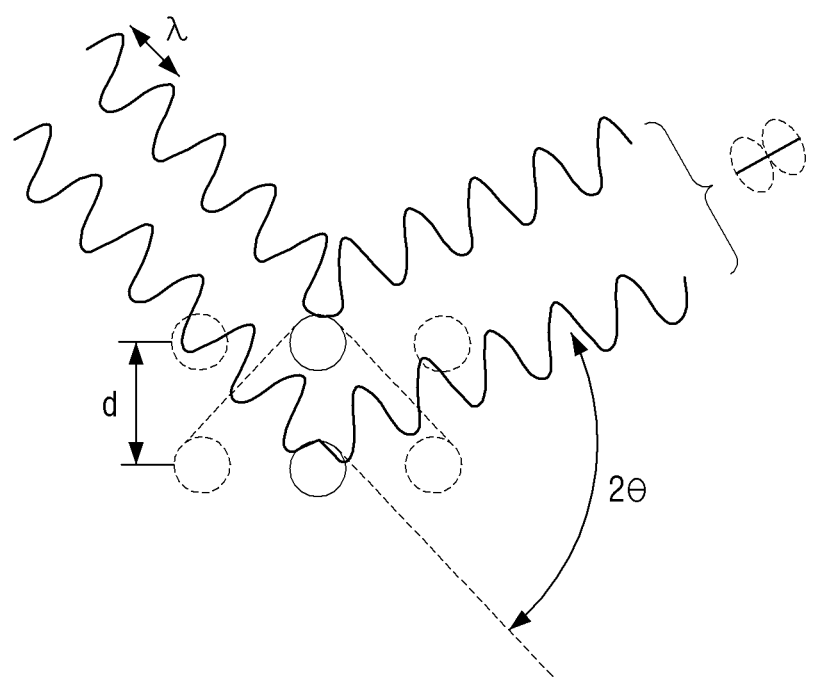

Referring to FIGS. 5B and 5C, diagrams are provided to explain Bragg's law which is considered a basic principle of FSS. Referring to FIG. 5B, a diagram illustrates a case in which the amplitude of the wavelength is amplified as the constructive interference occurs. Referring to FIG. 5C, a diagram illustrates a case in which the amplitude of the wavelength becomes 0 as the destructive interference occurs. According to Bragg's law, the constructive interference occurs when the path difference between two electromagnetic waves is an integer multiple of the electromagnetic wavelength. Referring to FIG. 5B, the interval between the elements constituting the lattice is d, and the wavelength of the electromagnetic wave is λ. When the incident angle of the electromagnetic wave is θ, the path difference between the electromagnetic wave reflected from the first layer and the electromagnetic wave reflected from the second layer becomes 2 d sin θ. Thus, the constructive interference occurs when satisfying a following mathematical formula:

$$2d \sin \theta = n\lambda_{(n \text{ is integer})}$$

On the contrary, the destructive interference of FIG. 5C occurs when the path difference between the two electromagnetic waves is an integer multiple of the semi-wavelength. Thus, the destructive interference occurs when satisfying a following mathematical formula:

$$4d \sin \theta = n\lambda_{(n \text{ is integer})}$$

Thus, by adjusting the interval d between the elements of FSS, a desired wavelength may be constructive-interfered or destructive-interfered.

Figure 5D:
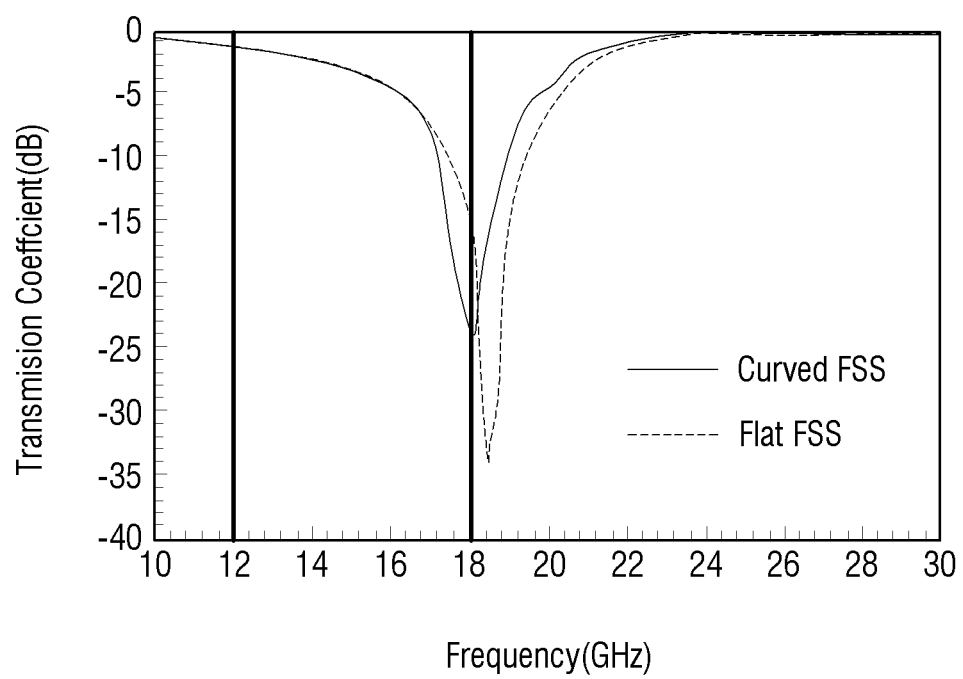

Referring to FIG. 5D, a graph illustrates the transmission properties of the FSS having 7×7 cross elements illustrated in FIG. 5A. Regarding the graph, note that the transmission properties at 18 GHz bandwidth electromagnetic wave is high. For example, it may be assumed that the reflective surface 211 of the first external device 210 is formed of the FSS of FIG. 5A. When the controller 160 controls the transmitter 120 to transmit the multi frequency signal including 12 GHz bandwidth electromagnetic wave and 18 GHz bandwidth electromagnetic wave as an identification signal, the 18 GHz bandwidth electromagnetic wave transmits through the reflective surface 211 of the first external device 210, while the 12 GHz bandwidth electromagnetic wave may hardly transmit through the reflective surface 211. Thus, the reflected signal may be formed mainly of the 12 GHz bandwidth electromagnetic wave. The controller 160 may identify that the reflected signal is reflected from the first external device 210 by analyzing the amplitude per frequency regarding the received reflected signal.

In addition, FIG. 5D compares the transmission properties of the curved FSS and the flat FSS. When the FSS is configured as a curved type, the resonance frequency slightly changes and the transmission rate is reduced. However, when the resonance frequency is compared with another bandwidth frequency, the curved FSS can be sufficiently identified. Recently, the curved form of the electronic devices and the displays increase. In this case, the reflective surface may be formed on the exterior of the electronic devices using the curved FSS.

According to another embodiment, the FSS may have a configuration of a plurality of layers. In this case, the operation on multiple frequencies is possible so that the pointing device 100 can identify a targeted external device (i.e., a device that is pointed at) from a large number of external devices. For another example, the controller 160 may analyze the phase of the received reflected signal and identify the external device by utilizing the phase of the electromagnetic wave, which can be varied with the FSS.

According to an embodiment, the controller 160 may determine whether the identified external device is registered. When the identified external device is registered, the controller 160 may control the display 140 to output information of the identified external device. In this case, information of the external device 200 may be output by using the information stored in the pointing device 100 without having to perform a separate communication.

Figure 6:
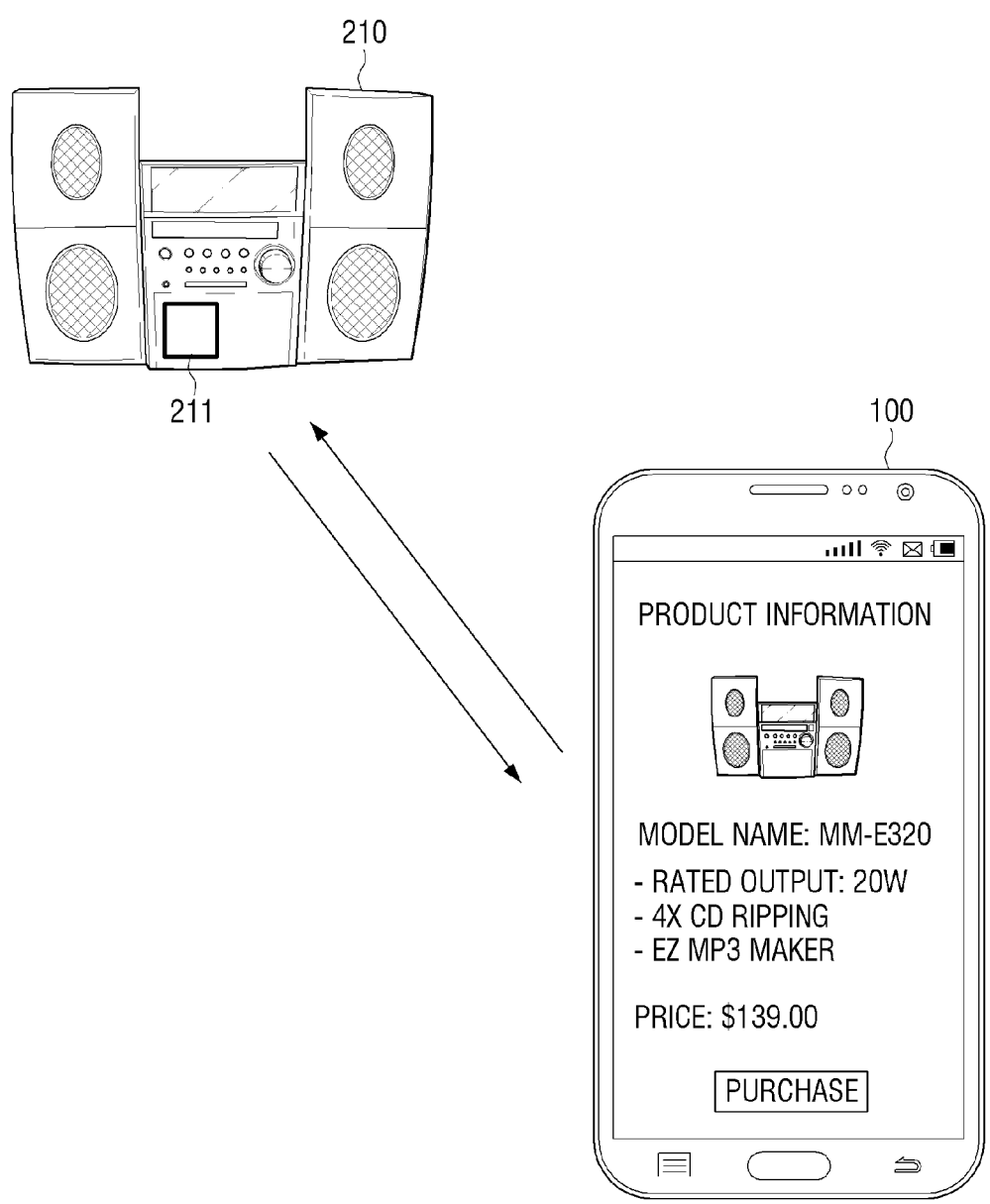
FIG. 6 is a diagram provided to illustrate outputting external device information according to an embodiment of the present disclosure.

FIG. 6 is a diagram provided to illustrate outputting external device information according to an embodiment of the present disclosure.

Referring to FIG. 6, the pointing device 100, which is implemented as a smartphone, may be oriented to transmit an identification signal to the audio source 210. The controller 160 may determine that the indicated external device is the audio source 210 by analyzing the reflected signal, which is reflected from the reflective surface 211. The controller 160 may determine whether the audio source 210 is registered or not. When the audio source 210 is registered, the controller 160 may display information regarding the audio source 210. For example, a model name, a specification or a price regarding the audio 210 may be displayed. Further, in addition to operating the audio source 210, a user may be provided with the product information by using the pointing device 100 at a public place such as electronic device retailer, and may purchase the product via information that is provided through an on-line market. In another implementation, purchase information may be sent to a cashier of an off-line store in response to pressing on a purchase button.

According to another embodiment, the controller 160 may connect with the external device for communication according to a user command, control the communicator 150 to receive information related with the content output from the external device, and control the display 140 to output the received information.

Figure 7:
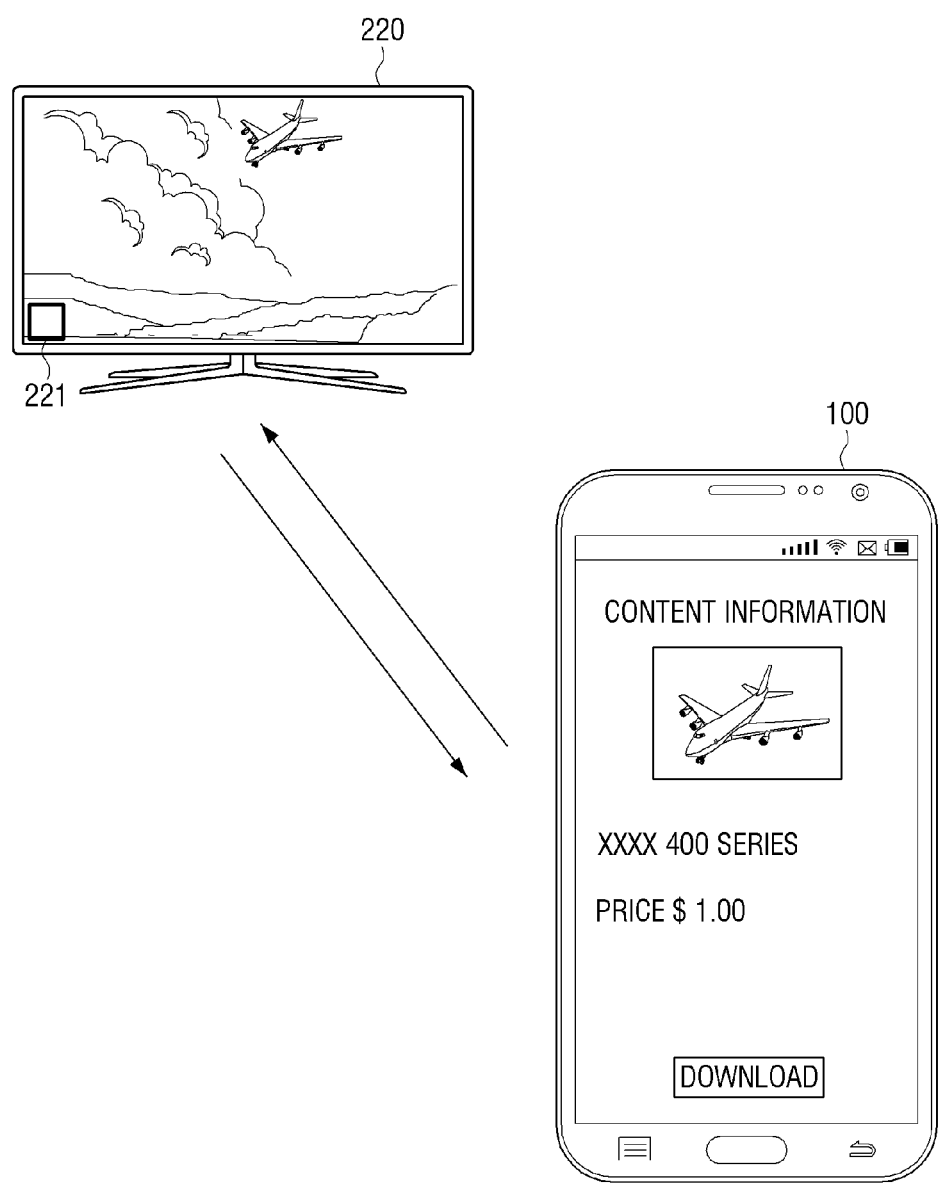
FIG. 7 is a diagram provided to illustrate outputting content-related information according to an embodiment of the present disclosure.

FIG. 7 is a diagram provided to illustrate content-related information according to an embodiment of the present disclosure.

Referring to FIG. 7, the pointing device 100 is implemented as a smartphone and may transmit an identification signal to the TV 220. The receiver 130 may receive a reflected signal that is reflected from the reflective surface 221 attached to the TV 220, and the controller 160 may identify the TV 220. The TV 220 may output a broadcast program, and the controller 160 may control the display 140 to display information related with the broadcast program output from the TV 220. The related information may include thumbnail images, broadcast program title, or episode number of the content. Further, the pointing device 100 may be additionally provided with a function to download video on demand (VOD) of the program which is airing on the TV 220.

The pointing device 100 may be provided with information related to the content that is output from the external device 200 by communicating with the network such as the Internet. For example, when the TV 220 displays a documentary VOD, the pointing device 100 may receive and display script or sign language video of the documentary VOD from an external server. The pointing device 100 may separately display the script or the sign language video, thus enhancing viewer experience as compared to when the script or the sign language is concurrently displayed on the TV 220, which can be quite disturbing.

A user may operate a single electronic device from a plurality of fixed electronic devices with the pointing device 100 described above. Further, a user may identify the devices by attaching or coating a reflective material on the related electronic devices without having to modify the hardware.

Figure 8:
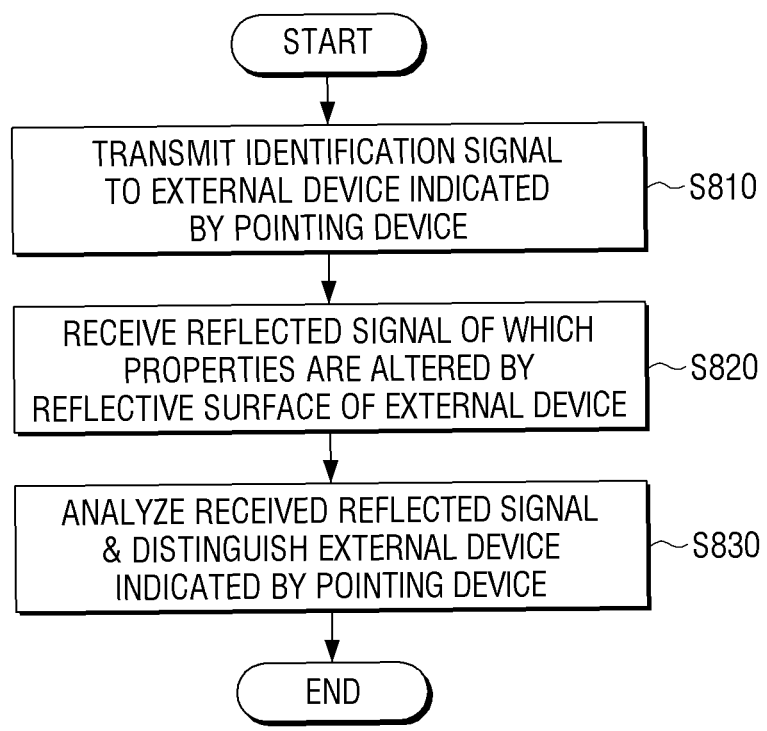
FIG. 8 is a flowchart of a method of a pointing device according to various embodiments of the present disclosure.

FIG. 8 is a flowchart of a method of operating a pointing device according to an embodiment of the present disclosure.

Referring to FIG. 8, at operation S810, the pointing device may transmit an identification signal to the external device according to a user input. The identification signal transmitted by the pointing device may be multi-wavelength infrared signal or multi-frequency signal. At operation S820, the pointing device may receive a reflected signal, which is the transmitted identification signal that is reflected from the reflective surface attached on the surface of the external device. For example, the reflective surface may be formed by coating the pigment that reflects a preset wavelength from the multi-wavelength infrared signal. For another example, the reflective surface may include an FSS to amplify or offset the amplitude of a preset frequency among the multi-frequency signal. At operation S830, the pointing device may analyze the reflected signal and identify the external device that is targeted by the pointing device. The pointing device may analyze the reflected signal and perform an arithmetic operation to identify the external device according to the signal intensity per wavelength or the amplitude size per frequency. After identifying the external device, the pointing device may generate and transmit an operating signal for the identified external device. In this case, the remaining external devices do not perform an operation in response to receiving the operating signal for the identified external device. Thus, the pointing device may select and operate the specific external device without experiencing interference. For example, when a user depresses the button '+' on the pointing device, and when the identified external device is the audio source, the operation may increase the volume of the audio source while another external device (e.g., the air conditioner) may not perform any operation. On the contrary, when the identified external device is the air conditioner, the operation may increase the setting temperature of the air conditioner while the volume of the audio source does not change.

Figure 9:
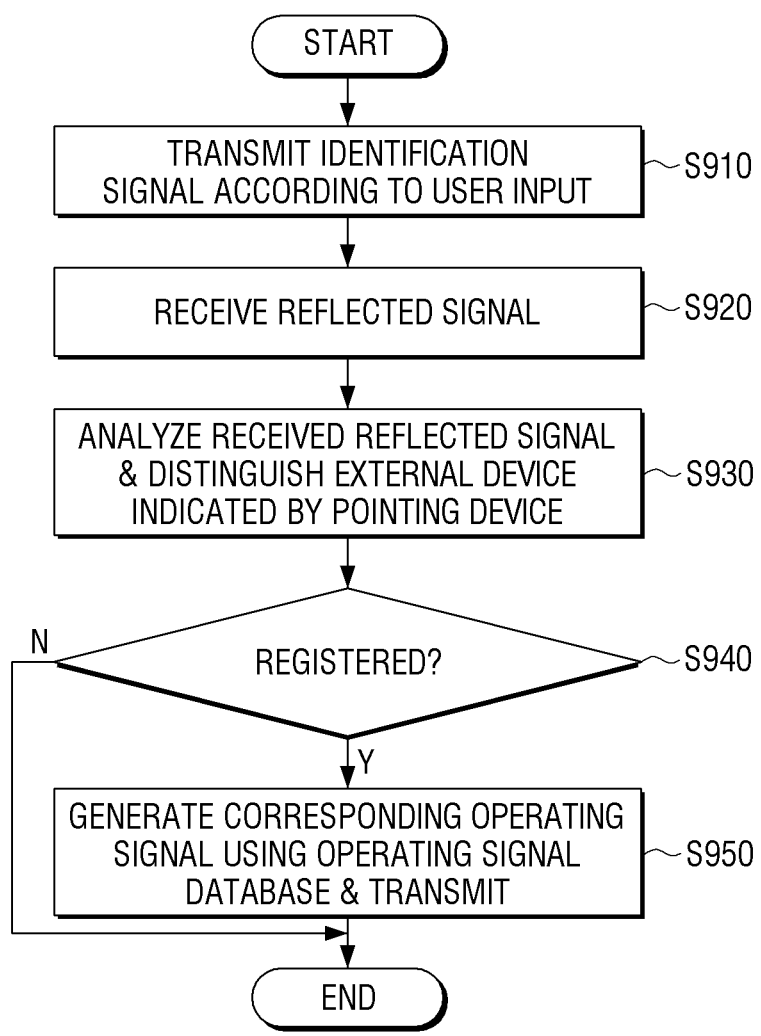
FIG. 9 is a flowchart of a method of operating a pointing device according to another embodiment of the present disclosure.

FIG. 9 is a flowchart of a method of operating a pointing device according to another embodiment of the present disclosure.

Referring to FIG. 9, at operation S910, the pointing device may transmit an identification signal to an external device according to a user input. At operation S920, the pointing device may receive a reflected signal that is reflected from the reflective surface of the external device. At operation S930, the pointing device may analyze the reflected signal and identify the external device that is targeted by the pointing device. At operation S940, the pointing device may determine whether the identified external device is registered or not. The "registered device" refers to an external device having reflecting properties of the reflected signal and device specification (i.e., operating signals) stored in advance in the pointing device. A user may register a new external device on the pointing device 100 through automatic updating or manual inputting. If the identified external device is registered, at operation S940, the pointing device may generate a corresponding operating signal by using the operating signal database, and transmit the operating signal for the identified external device, at operation S950. The operating signal database may include different operating signal codes according to types of the registered devices.

Figure 10:
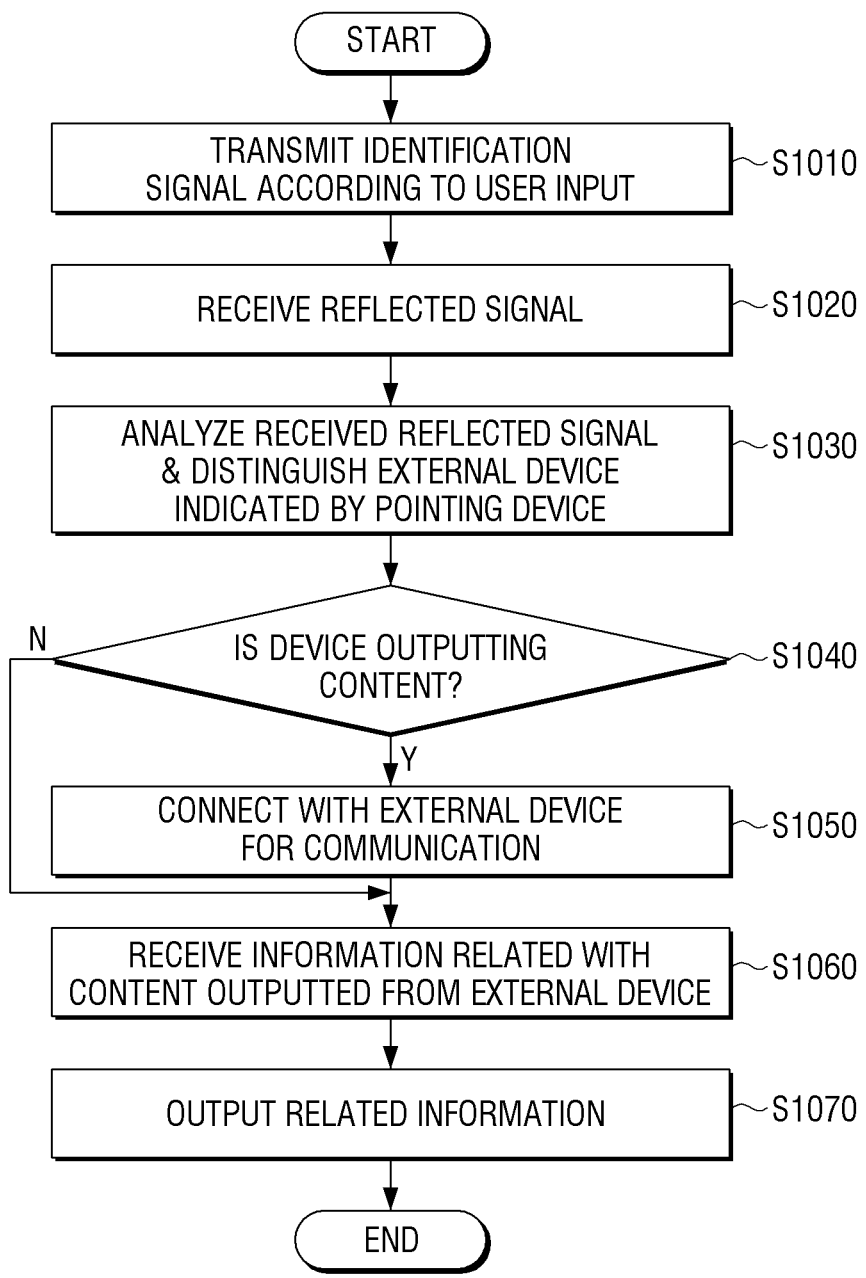
FIG. 10 is a flowchart of a method of operating a pointing device according to another embodiment of the present disclosure.

FIG. 10 is a flowchart of a method of operating a pointing device according to another embodiment of the present disclosure.

Referring to FIG. 10, at operation S1010, the pointing device may transmit an identification signal to an external device according to a user input. At operation S1020, the pointing device may receive a reflected signal that is reflected from the reflective surface of the external device. At operation S1030, the pointing device may analyze the reflected signal and identify the external device that is targeted by the pointing device. At operation S1040, the pointing device may determine whether the identified external device outputs content. When the identified external device outputs content at operation S1040, information may be provided so that a user views content-related information on the pointing device. At operation S1050, the pointing device may connect with the external device for communication according to a user command. Herein, the pointing device may be connected to the communication network such as the Internet as well as the external device. At operation S1060, the pointing device may receive information related with the content that is output from the external device. The pointing device may obtain the information directly from the external device or receive the related information by connecting to the Internet. The related information may include thumbnail images, title, or summary of the content. For example, when the distinguished external device is an audio source, the related information may include information of the music source or a program schedule of radio broadcasting. At operation S1070, after receiving the related information, the pointing device may output the received related information for a user. The user may obtain the related information from the pointing device without having to operate the external device.

According to the controlling method of the pointing device described above, a user may identify a plurality of the external devices, may select and operate a specific external device, and may be provided with information related with the specific external device through the display of the pointing device, all by using one pointing device.

The program codes to perform the above controlling method may be stored in various types of recording medium. Specifically, the program codes may be stored in various types of recording medium that can be read by a terminal such as RAM, flash memory, ROM, erasable programmable ROM (EPROM), electronically erasable and programmable ROM (EEPROM), register, hard disk, removable disk, memory card, universal serial bus (USB) memory or compact disc ROM (CD-ROM).

According to another embodiment, the pointing device 100 enables integrated operating and setting of a plurality of the external devices 200. Various types of electronic devices may be connected to each other through a network such as a home network. In this case, the pointing device 100 may identify a plurality of external devices connected to each other, and may be used to store data or establish an environment on the identified external device among the external devices. A second external device may operate by using the data or information stored or set on the first external device with the pointing device 100. Thus, a plurality of the external devices may be integrally operated by the pointing device 100. For example, the pointing device 100 may store information regarding the environment setting when viewing the movie on the smart TV. If a VOD movie is output via a smart TV with a three dimensional (3D) effects, the stored environment setting information may induce an audio source to output a 3D audio and change the air conditioner into a noise-free mode. Thus, when a user gives an operating command to display the movie VOD on the smart TV by using the pointing device 100, the smart TV, the audio source and the air conditioner may be interoperated to provide the operation according to the stored environment setting information.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling a pointing device, the method comprising:
    transmitting a multi-wavelength infrared signal to an external device that is pointed at by the pointing device;
    receiving a reflection signal that is generated by reflecting a signal of a preset wavelength among the multi-wavelength infrared signal by a reflective surface attached to a surface of the external device;
    comparing the preset wavelength of the reflection signal and a wavelength corresponding to each of a plurality of external devices based on wavelength information stored in the pointing device; and
    identifying the external device corresponding to the preset wavelength of the reflection signal based on a result of the comparison,
    wherein the wavelength information includes information on a wavelength corresponding to each of a plurality of external devices.

2. The method of claim 1, wherein the reflective surface is coated with a pigment that reflects the preset wavelength.

3. The method of claim 1,
    wherein the multi-wavelength infrared signal is a multi-frequency signal, and
    wherein the reflection signal is generated by amplifying or offsetting an amplitude of a preset frequency of the multi-frequency signal.

4. The method of claim 3, wherein the reflective surface comprises a frequency selective surface (FSS) that amplifies or offsets the preset frequency.

5. The method of claim 1, further comprising:
    generating an operating signal corresponding to the identified external device, and
    transmitting the operating signal.

6. The method of claim 5, further comprising:
    determining whether the identified external device is registered,
    wherein, when the identified external device is registered, the generating of the operating signal comprises generating the operating signal based on an operating signal database.

7. The method of claim 1, further comprising:
    determining whether the identified external device is registered; and
    outputting information regarding the identified external device when the identified external device is registered.

8. The method of claim 1, further comprising:
    connecting with the identified external device for communication according to a user command;
    receiving information related to content output by the identified external device; and
    outputting the related information.

9. A pointing device comprising:
    a user interface configured to receive a user input;
    a transmitter;
    a receiver; and
    at least one processor configured to:
        control the transmitter to transmit a multi-wavelength infrared signal to an external device according to the user input,
        control the receiver to receive a reflection signal that is generated by reflecting a signal of a preset wavelength among the multi-wavelength infrared signal by a reflective surface attached to a surface of the external device,
        compare the preset wavelength of the reflection signal and a wavelength corresponding to each of a plurality of external devices based on wavelength information stored in the pointing device, and
        identify the external device corresponding to the preset wavelength of the reflection signal based on a result of the comparison,
    wherein the wavelength information includes information on a wavelength corresponding to each of the plurality of external devices.

10. The pointing device of claim 9, wherein the reflective surface is coated with a pigment that reflects the preset wavelength.

11. The pointing device of claim 9, wherein the multi-wavelength infrared signal is a multi-frequency signal, and
    wherein the reflection signal is generated by amplifying or offsetting an amplitude of a preset frequency of the multi-frequency signal.

12. The pointing device of claim 11, wherein the reflective surface comprises a frequency selective surface (FSS) that amplifies or offsets the preset frequency.

13. The pointing device of claim 9, wherein the at least one processor is further configured to:
    generate an operating signal corresponding to the identified external device, and
    control the transmitter to transmit the operating signal.

14. The pointing device of claim 13, wherein the at least one processor is further configured to:
    determine whether the identified external device is registered, and
    when the identified external device is registered, generate the operating signal based on an operating signal database.

15. The pointing device of claim 9, further comprising:
    a display,
    wherein the at least one processor is further configured to:
        determine whether the identified external device is registered, and
        when the identified external device is registered, control the display to output information regarding the identified external device.

16. The pointing device of claim 9, further comprising:
    a display; and
    a communicator configured to communicate with the identified external device,
    wherein the at least one processor is further configured to:
        connect with the identified external device for communication according to a user command,
        control the communicator to receive information related to content output from the identified external device, and
        control the display to output the related information.

* * * * *